(12) United States Patent
Miyamoto

(10) Patent No.: US 7,715,205 B2
(45) Date of Patent: May 11, 2010

(54) SELF-EXCITED INVERTER CIRCUIT

(75) Inventor: Hitoshi Miyamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/494,358

(22) Filed: Jul. 26, 2006

(65) Prior Publication Data

US 2007/0046328 A1 Mar. 1, 2007

(30) Foreign Application Priority Data

Jul. 26, 2005 (JP) .............................. 2005-005942

(51) Int. Cl.
*H05K 1/18* (2006.01)
*G05F 1/00* (2006.01)

(52) U.S. Cl. .................. 361/764; 361/760; 361/761; 361/748; 361/600; 315/291; 315/307; 315/363; 315/274

(58) Field of Classification Search ............. 315/209 R, 315/219, 224, 225, 226, 291, 210, 211, 212, 315/307, 363; 361/760, 761, 764, 748, 600, 361/627, 623, 622, 633, 717–720, 736
See application file for complete search history.

(56) References Cited

U.S. PATENT DOCUMENTS

| | | | | |
|---|---|---|---|---|
| 3,836,815 | A | * | 9/1974 | Herzog .......................... 315/86 |
| 4,104,715 | A | * | 8/1978 | Lawson, Jr. .................... 363/37 |
| 4,127,782 | A | * | 11/1978 | Omura et al. ............... 307/10.1 |
| 5,495,405 | A | * | 2/1996 | Fujimura et al. ............. 363/133 |
| 7,378,804 | B2 | * | 5/2008 | Mitsuyasu et al. ........... 315/247 |
| 2005/0078080 | A1 | | 4/2005 | Kang et al. ................... 345/102 |
| 2006/0087258 | A1 | * | 4/2006 | Kubota et al. ................ 315/291 |

FOREIGN PATENT DOCUMENTS

| | | |
|---|---|---|
| GB | 940597 | 10/1963 |
| JP | 56-49681 | 5/1981 |

(Continued)

OTHER PUBLICATIONS

Search Report of the United Kingdom Patent Office, Patents Directorate, for patent application GB0614781.3, mailed Oct. 16, 2006, 3 pages.

(Continued)

*Primary Examiner*—Tuyet Vo
(74) *Attorney, Agent, or Firm*—Osha • Liang LLP

(57) ABSTRACT

A self-excited inverter circuit, includes: a booster transformer with a secondary coil, a feedback coil, and a primary coil respectively wound thereon, the primary coil including a center tap to which operating power can be supplied; a first N-channel FET having a drain to which is connected one terminal of the primary coil, and having a gate to which is connected one terminal of the feedback coil; and a second N-channel FET having a drain to which is connected the other terminal of the primary coil, and having a gate to which is connected the other terminal of the feedback coil, wherein: using a high voltage drive output generated in the secondary coil when the first and second N-channel FETs are turned on alternately, a discharge tube is driven and turned on; and the first and second N-channel FETs are both formed in a single package.

3 Claims, 3 Drawing Sheets

FOREIGN PATENT DOCUMENTS

| | | |
|---|---|---|
| JP | 11-235052 | 8/1999 |
| JP | 2000-69767 | 3/2000 |
| JP | 2003-317988 | 11/2003 |

OTHER PUBLICATIONS

Patent Abstracts of Japan, Publication No. 2000-069767, Publication Date: Mar. 3, 2000, 1 page.

Patent Abstracts of Japan, Publication No. 56-049681, Publication Date: May 6, 1981, 1 page.

Patent Abstracts of Japan, Publication No. 11-235052, Publication Date: Aug. 27, 1999, 1 page.

Patent Abstracts of Japan, Publication No. 2003-317988, Publication Date: Nov. 7, 2003, 1 page.

* cited by examiner

PRIOR ART

SELF-EXCITED INVERTER CIRCUIT

BACKGROUND

1. Technical Field

The present invention relates to a self-excited inverter circuit which, using a high voltage drive output generated in a secondary coil when two FETs with their respective drains connected to a primary coil are turned on alternately, drives and turns on a discharge tube serving as the light source of the back light of a liquid crystal panel and, more specifically, the invention relates to a self-excited inverter circuit arranged such that two FETs are formed in a single package.

2. Related Art

As a circuit for driving a cold cathode tube serving as the light source of the backlight of a liquid crystal display device having a size of about 15 inches, there is used such a self-excited inverter circuit as shown in FIG. 2. That is, in this inverter circuit, when a pair of N-channel FETs (which are hereinafter referred to as FETs simply) 11, 12 are turned on alternately, there is generated a high voltage drive output in a secondary coil L2, and the thus generated high voltage drive output is used to drive and turn on a cold cathode tube 4. Also, for the FETs 11, 12, there is used an element (for example, a PW-MOLD type element) formed in a package which can be mounted on a soldered surface and the respective drains of the FETs 11, 12, as shown in FIG. 4, are connected through patterns 81, 82 to a primary coil L1 (in a package 91, there is formed the FET 11; and, in a package 92, there is formed the FET 12).

As described above, the FET 11 and FET 12 are different elements which are respectively formed in mutually different packages. Therefore, the gate threshold voltage of the FET 11 and the gate threshold voltage of the FET 12 can differ greatly from each other due to variations in production. In this case, there is generated a relatively large difference between the turn-on period of the FET 11 and the turn-on period of the FET 12. And, in the FET the turn-on period of which is long, the heat value thereof is larger than that of the other FET and thus the element temperature thereof is higher. As a result of this, on the side where the element temperature is higher, the gate threshold value voltage becomes low and thus the turn-on period thereof increases further. That is, between the two FETs, a difference in the turn-on periods thereof increases. And, when the difference in the turn-on periods between the two FETs increases and thus imbalance between the switching operations increases, the wave form of the high voltage drive output for driving and turning on the cold cathode tube 4 is distorted. This incurs an inconvenience that a given level of luminance cannot be obtained, or the like.

In view of the above circumstances, there has been proposed a technique to be disclosed below (which is herein referred to as a first conventional technique). That is, in this technique, bias voltages to be applied to the gates of switching FETs are generated using a voltage divider circuit. And, the bias voltages generated in the voltage divider circuit are guided to the respective gates of the switching FETs through resistors so provided as to correspond to their respective switching FETs. Also, there are provided a diode with its cathode connected to the drain of one FET and its anode connected to the gate of the other FET, a diode with its cathode connected to the drain of the other FET and its anode connected to the gate of one FET. Therefore, on the side of the FET to be turned on, a voltage to be applied to the gate thereof is automatically controlled so as to provide a proper value in the vicinity of the threshold value. That is, even when the gate threshold value voltage varies, the voltage to be applied to the gate is controlled so as to correct such variation. As a result of this, there can be prevented the occurrence of a situation that the turn-on period of one FET is longer than that of the other FET, which can in turn prevent the occurrence of the distorted wave form of the high voltage drive output (for example, see JP-A-11-235052).

Also, there has been proposed another technique to be discussed below (which is herein referred to as a second technique). That is, this technique is applied to a half bridge type inverter circuit. Specifically, this technique is applied to a circuit which, as switching elements, uses a pair of elements composed of a complementary combination of an N-channel FET and a P-channel FET. And, with regard to the two FETs, namely, the N-channel FET and P-channel FET, there is employed a structure in which they are formed in the same package. Also, as for a pair of Zener diodes to be connected between the gate of one complementary FET and the source of the other complementary FET as well, there is used a structure in which the pair of Zener diodes are formed in the same package. As a result of this, the area of the circuit necessary for mounting the elements can be reduced, thereby being able to enhance the mounting efficiency of the elements (for example, see JP-A-2003-317988).

SUMMARY

However, when the first conventional technique is used, there are required a diode which is connected between the drain of one side FET and the gate of the other side FET and a diode to be connected between the drain of the other side FET and the gate of one side FET. This results in an increase in the number of elements.

In the second conventional technique, as a pair of complementary FETs, there are used elements which are formed in the same package. In other words, the second conventional technique aims at enhancing the mounting efficiency of the elements. Thus, from the viewpoint of eliminating the inconvenience that a difference in the temperature between a pair of N-channel FETs is incurred to thereby increase a difference between gate threshold voltages, resulting in the increased imbalance between the switching operations of the FETs, the object of the second conventional technique is different from the object expected here.

Also, as shown in FIG. 4, when the FET 11 is formed in the package 91 and the FET 12 is formed in the package 92, because of the need for formation of other patterns (not shown), the packages 91, 92 are inevitably to be mounted at positions distant from a booster transformer (which is shown as T9 in FIG. 4). As a result of this, the path lengths of the patterns 81, 82 are long. On the other hand, currents flowing through the patterns 81, 82 are drain currents each having a large current value. Because of this, the levels of the electromagnetic noises radiated from the patterns 81, 82 are large. This limits the mounting position of a substrate with a self-excited inverter circuit formed thereon, which makes it difficult to adjust the position relationship of the substrate with other parts.

The present invention is made to solve the above problems and thus the object of the invention is to provide a self-excited inverter circuit which can prevent the switching imbalance caused by an increase in temperature between a pair of N-channel FETS; even when there is employed a structure in which two N-channel FETs are formed in a package, can control the heat radiation thereof to an amount equivalent to that of heat radiated by a package with a single FET formed therein to thereby be able to prevent an excessive increase in the temperature of the package; and, can reduce the level of electromagnetic noises radiated by the two FETs.

Also, it is a second object of the invention to provide a self-excited inverter circuit in which a pair of N-channel FETs for execution of switching are both formed in a single package to thereby be able to restrict the imbalance of the switching caused by an increase in a temperature difference between the pair of N-channel FETs.

In addition to the above objects, it is a third object of the invention to provide a self-excited inverter circuit in which the voltage of an operating power supply is set higher than 15 V, whereby, even when there is employed a structure in which two N-channel FETs are formed in a single package, the heat radiation of the package can be made equivalent to the heat radiation of a package with a single element formed therein to thereby be able to prevent an excessive increase in the temperature of the package.

To solve the above problems, a self-excited inverter circuit according to the invention is applied to a self-excited inverter circuit which comprises: a booster transformer with a secondary coil, a feedback coil and a primary coil respectively wound thereon, the primary coil including a center tap to which operating power can be supplied; a first N-channel FET having a drain to which is connected one terminal of the primary coil and having a gate to which is connected one terminal of the feedback coil; and, a second N-channel FET having a drain to which is connected the other terminal of the primary coil and having a gate to which is connected the other terminal of the feedback coil, wherein, using a high voltage drive output to be generated in the second coil when the first and second N-channel coils are turned on alternately, a discharge tube serving as the light source of the backlight of a liquid crystal panel is driven and turned on, and the booster transformer is mounted on the part surface of a single-sided substrate. In this self-excited inverter circuit, the first and second N-channel FETs are both formed in a single package, the package is surface mounted on a soldered surface adjacent to the booster transformer in such a mounting direction that the drain terminal of the first N-channel FET and the drain terminal of the second N-channel FET respectively face the booster transformer, the liquid crystal panel is formed to have a size of about 15 inches, and the voltage of the operating power to be supplied to the center tap of the primary coil is set in the vicinity of 20 V.

In other words, when the gate threshold voltage of the first N-channel FET is lower than the gate threshold voltage of the second N-channel FET, the on time of the first N-channel FET is longer. Therefore, the heat value of the first N-channel FET is larger than the heat value of the second N-channel FET. However, since the first and second N-channel FETs are closely heat connected with each other, a temperature difference between them is restricted to a slight value. This makes it possible to prevent an increase in the difference between the gate threshold voltages which is caused by an increase in the temperature difference. As a result of this, a difference between the on times of the first and second N-channel FETs is restricted to a value corresponding to a difference between the gate threshold voltages when the element temperatures are equal to each other. Accordingly, a difference between the on times of the first and second N-channel FETs is restricted to a slight value. Also, when the voltage of the operating power is changed from 12 V in the prior art to a value higher than 15 V, the drain current decreases accordingly to the degree that the voltage is raised. Therefore, the heat values of the first and second N-channel FETs decrease. Thanks to this, the heat value of a package with the first and second N-channel FETs formed therein can be made substantially equivalent to the heat value of a package in which only one N-channel FET is formed. Also, it is possible to reduce a pattern length for connecting the drain of the first N-channel FET to the primary coil as well as a pattern length for connecting the drain of the second N-channel FET to the primary coil.

Also, a self-excited inverter circuit according to the invention is applied to a self-excited inverter circuit which comprises: a booster transformer with a secondary coil, a feedback coil and a primary coil respectively wound thereon, the primary coil including a center tap to which operating power can be supplied; a first N-channel FET having a drain to which is connected one terminal of the primary coil and having a gate to which is connected one terminal of the feedback coil; and, a second N-channel FET having a drain to which is connected the other terminal of the primary coil and having a gate to which is connected the other terminal of the feedback coil, wherein, using a high voltage drive output to be generated in the second coil when the first and second N-channel coils are turned on alternately, a discharge tube serving as the light source of the backlight of a liquid crystal panel is driven and turned on. And, the first and second N-channel FETs are both formed in a single package.

In other words, when the gate threshold voltage of the first N-channel FET is lower than the gate threshold voltage of the second N-channel FET, the on time of the first N-channel FET is longer. Therefore, the heat value of the first N-channel FET is larger than the heat value of the second N-channel FET. However, since the first and second N-channel FETs are closely heat connected with each other, a temperature difference between them is restricted to a slight value. This makes it possible to prevent an increase in the difference between the gate threshold voltages which is caused by an increase in the temperature difference. As a result of this, a difference between the on times of the first and second N-channel FETs is restricted to a value corresponding to a difference between the gate threshold voltages when the element temperatures are equal to each other. Accordingly, a difference between the on times of the first and second N-channel FETs is restricted to a slight value.

Also, in addition to the above structure, the liquid crystal panel is formed to have a size of 20 inches or less and the voltage of the operating power to be supplied to the center tap of the primary coil is set for a voltage higher than 15 V. In other words, when the voltage of the operating power supply is changed from the voltage 12 V in the prior art to a voltage higher than 15 V, the drain current decreases accordingly to the degree that the voltage is raised. Therefore, the heat values of the first and second N-channel FETs decrease. Thanks to this, the heat value of the package with the first and second N-channel FETs formed therein can be made substantially equivalent to the heat value of a package in which only one N-channel FET is formed.

According to the invention, even when there is a difference between the gate threshold voltages of the first and second N-channel FETs, a difference between the on times of the first and second N-channel FETs can be restricted to a value which corresponds to a difference between the gate threshold voltages when the element temperatures are equal. Thanks to this, a difference between the on times of the first and second N-channel FETs can be restricted to a slight value. Also, the drain current reduces according to the degree that the voltage of the operating power is increased. This reduces the heat values of the first and second N-channel FETs. Therefore, the heat value of the package with the first and second N-channel FETs formed therein can be made substantially equivalent to the heat value of a package in which only one N-channel FET is formed. Also, it is possible to reduce a pattern length for connecting the drain of the first N-channel FET to the primary coil as well as a pattern length for connecting the drain of the second N-channel FET to the primary coil. This makes it possible to restrict the switching imbalance which is caused by an increase in the temperature difference between the pair of N-channel FETs. And, even when there is employed a structure that two N-channel FETs are formed in a single package, the heat radiation of this package can be controlled to a level equivalent to the level of the heat radiation of a package in which only one FET is formed, thereby being able not only to prevent an excessive increase in the temperature of the package but also to reduce the level of electromagnetic noises to be radiated.

Also, according to the invention, even when there is a difference between the gate threshold voltages of the first and second N-channel FETs, a difference between the on times of the first and second N-channel FETs can be restricted to a value which corresponds to a difference between the gate threshold voltages when the element temperatures are equal. Thanks to this, a difference between the on times of the first and second N-channel FETs can be restricted to a slight value. This makes it possible to restrict the switching imbalance which is caused by an increase in the temperature difference between the pair of N-channel FETS.

Further, when the voltage of the operating power is changed from the voltage of 12 V in the prior art to a voltage higher than 15 V, the drain current decreases accordingly to the degree that the voltage is raised. Therefore, the heat value of the package with the first and second N-channel FETs formed therein can be reduced to a value substantially equivalent to the heat value of a package in which only one N-channel FET is formed. Thanks to this, even when there is employed a structure that two N-channel FETs are formed in a package, the heat radiation of this package can be controlled to a level equivalent to the level of the heat radiation of a package in which only one FET is formed, thereby being able to prevent an excessive increase in the temperature of the package.

BRIEF DESCRIPTION OF THE DRAWINGS

These and other objects and advantages of this invention will become more fully apparent from the following detailed description taken with the accompanying drawings in which.

DETAILED DESCRIPTION

Now, description will be given below of an embodiment of a self-excited inverter circuit according to the invention with reference to the accompanying drawings.

Figure 3:
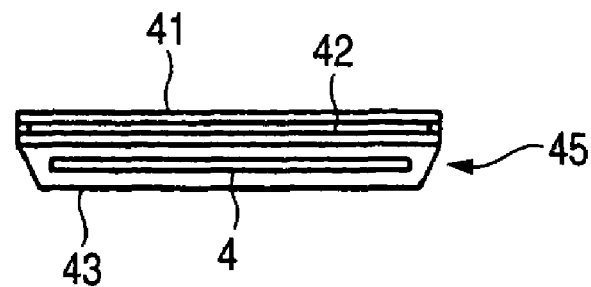
FIG. 3 is a schematic section view of the structure of a liquid crystal display part.
Figure 4:
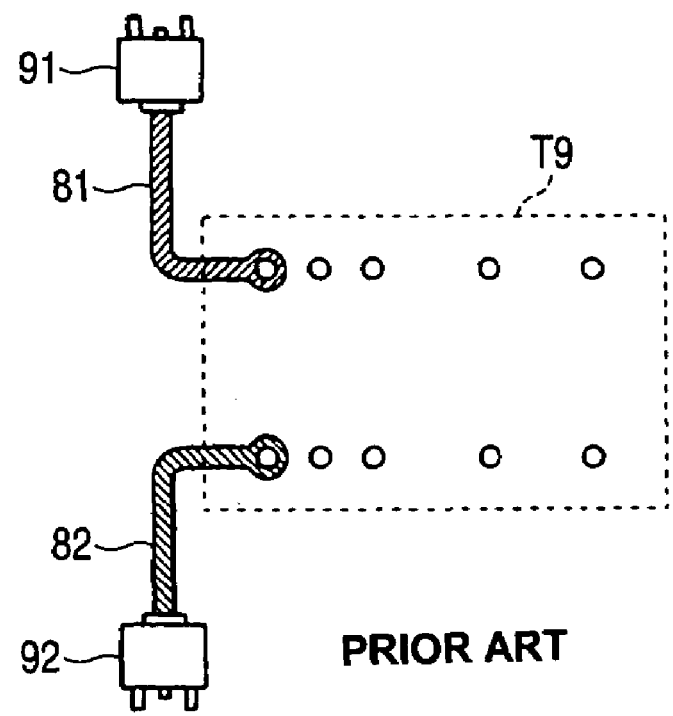
FIG. 4 is an explanatory view of the state of the portion of a substrate according to the prior art, specifically, showing the state thereof in the vicinity of a booster transformer and N-channel FETs formed therein.

FIG. 3 is a schematic section view of the structure of a liquid crystal display part which is the image display part of a television receiver.

The liquid crystal display part is generally composed of a liquid crystal panel 41 and a backlight 45, while the size of the liquid crystal panel 41 is 15 inches (the liquid crystal panel 41 can also have other sizes of 20 inches or smaller) Also, the backlight 45 comprises two U-shaped cold cathode tubes (discharge tubes) 4 serving as the light source of the backlight, a diffusion plate 42 for diffusing lights from the cold cathode tubes 4, and a reflecting plate 43 for reflecting the lights from the cold cathode tubes 4 onto the side of the diffusion plate 42.

Figure 2:
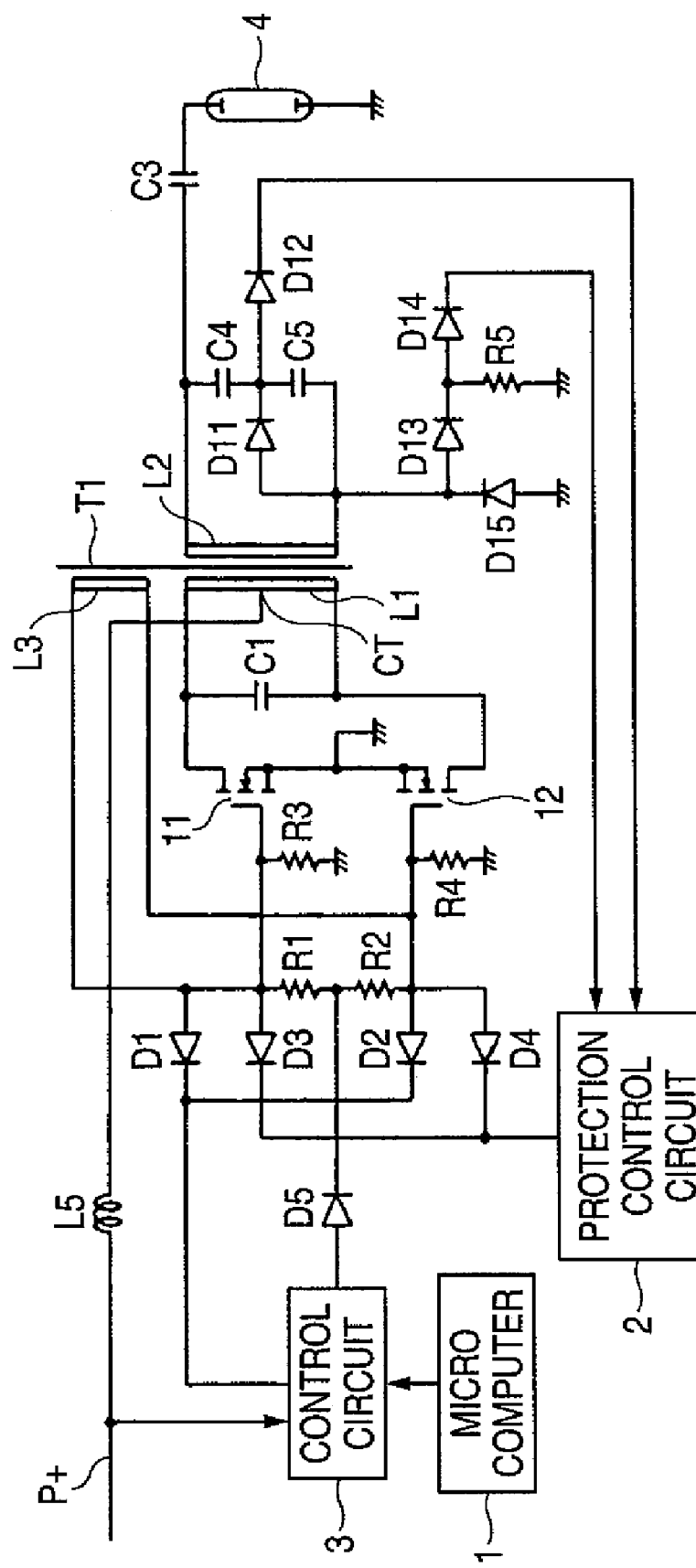
FIG. 2 is a circuit diagram of electrical connection employed in an embodiment of a self-excited inverter circuit according to the invention.

Now, FIG. 2 is a circuit diagram of the electric connection of a self-excited inverter circuit for driving and turning on the cold cathode tubes 4 (including a block diagram in part thereof), while the circuit configuration thereof is identical with the conventional circuit configuration.

On a booster transformer T1, there are wound a primary coil L1 having a center tap CT, a feedback coil L3, and a secondary coil L2. And, to the center tap CT, there is supplied operating power P+ of 20 V (the operating power can have other voltage in the range of 15 V or higher) through an inductance L5 which is used to restrict the leakage of noise components to the outside.

To one terminal of the primary coil L1, there is connected the drain of a first N-channel FET (which is hereinafter referred to as FET simply) 11. Also, to the other terminal of the primary coil L1, there is connected the drain of a second N-channel FET (which is hereinafter referred to as FET simply) 12. And, between the respective drains of the FETs 11 and 12, there is connected a capacitor C1 used to match the switching frequencies of the FETs to a given frequency. To the gate of the FET 11, there is connected one terminal of the feedback coil L3; and, to the gate of the FET 12, there is connected the other terminal of the feedback coil L3. And, the respective sources of the FETs 11 and 12 are both grounded.

Also, between the gate of the FET 11 and the ground level, there is connected a resistor R3 which is used to restrict an increase in gate impedance; and, between the gate of the FET 12 and the ground level as well, there is connected a resistor R4 for restricting an increase in gate impedance. And, to the gate of the FET 11, there is connected one terminal of a resistor R1, while, to the gate of the FET 12, there is connected one terminal of a resistor R2. The respective other terminals of the resistors R1 and R2 are connected to each other and are also connected to the cathode of a diode D5. And, the anode of the diode D5 is connected to a control circuit 3.

Also, to the gate of the FET 11, there are connected the anode of a diode D1 and the anode of a diode D3, whereas, to the gate of the FET 12, there are connected the anode of a diode D2 and the anode of a diode D4. And, the cathode of the diode D1 and the cathode of the diode D2 are connected to each other and also are connected to the control circuit 3. Also, the cathode of the diode D3 and the cathode of the diode D4 are connected to each other and are also connected to a protection control circuit 2.

One terminal of the secondary coil L2 is connected to one terminal of the cold cathode tube 4 through a capacitor C3 for connection. And, the other terminal of the cold cathode tube 4 is grounded. Also, to the other terminal of the secondary coil L2, there are connected the anode of a diode D11 and one terminal of a capacitor C5. And, to the cathode of a diode D11, there are connected the other terminal of the capacitor 5 as well as one terminal of a capacitor C4 and the anode of a diode D12. The other terminal of the capacitor C4 is connected to one terminal of the secondary coil L2, while the cathode of the diode D12 is guided to the protection control circuit 2 as an output for detection of an overvoltage.

Also, to the other terminal of the secondary coil L2, there are connected the anode of a diode D13 and the cathode of a diode D15. And, to the cathode of the diode D13, there are connected the anode of a diode D14 and one terminal of a resistor R5, while the cathode of the diode D14 is guided to the protection control circuit 2 as an output for detection of an overcurrent. Also, the other terminal of the resistor R5 and the anode of the diode D15 are both grounded.

When the output level of the cathode of the diode D12 or the output level of the cathode of the diode D14 exceeds a given level, the protection control circuit 2 grounds the cathode of the diode D3 and the cathode of the diode D4 to bring a bias voltage applied to the gates of the FETs 11, 12 into a value near 0 (zero), thereby causing the switching operations of the FETs 11, 12 to stop. And, the protection control circuit 2 keeps this state until the power supply is turned off.

The control circuit 3 operates such that, in accordance with an instruction from a microcomputer (which is hereinafter referred to as a microcomputer) 1, when the power supply is turned on, it outputs to the cathode of the diode D5 a voltage for biasing the gates of the FETs 11, 12. Also, in accordance with an instruction from the microcomputer 1, the control circuit 3 grounds the respective cathodes of the diodes D1, D2.

The microcomputer 1 controls main operations which are performed as the operations of a television receiver. Thus, the microcomputer 1 controls the operation of a television circuit part (not shown) (which receives commercial broadcasting and generates a display signal for driving the liquid crystal panel 41). Also, when the power supply is turned on, the microcomputer 1 controls the control circuit 3 to apply a bias voltage to the gates of the FETs 11, 12, thereby allowing the FETs 11, 12 to execute their switching operations. During the time while the FETs 11, 12 are executing their switching operations, the microcomputer 1 controls the control circuit 3 to ground the cathodes of the diodes D1, D2 with a duty ratio corresponding to the luminance of images, thereby setting the luminance of the cold cathode tube 4 for the luminance that corresponds to the image luminance.

By the way, in the present embodiment, as has been already described, there are provided two cold cathode tubes. For this reason, to drive and turn on a different cold cathode tube (not shown) than the cold cathode tube 4, on the booster transformer T1, there is wound a different secondary coil from the secondary coil L2 and, at the same time, there are provided elements which are to be connected to the secondary coil. However, these parts are not shown in the accompanying drawings.

Figure 1A:
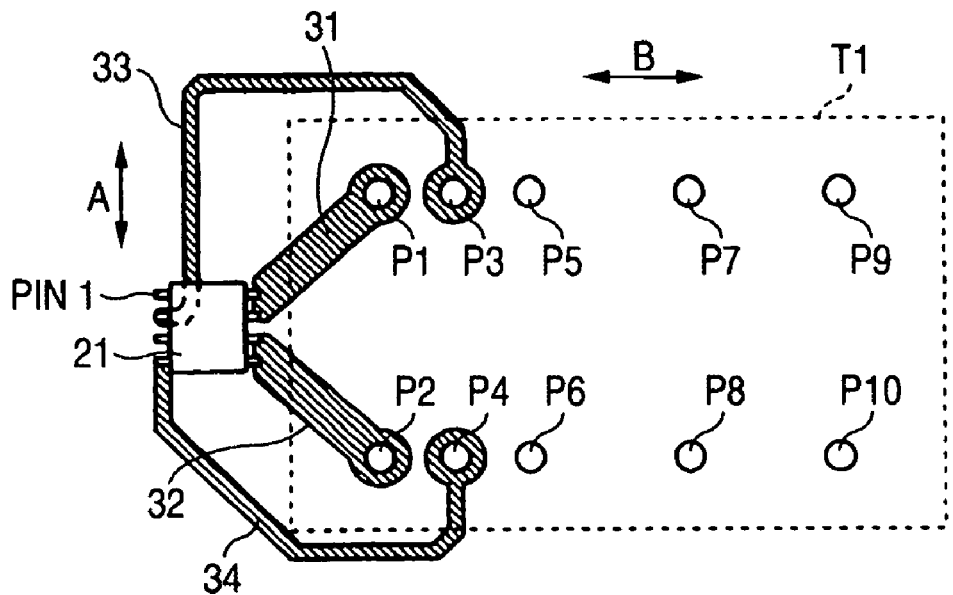
FIGS. 1A and 1B are explanatory views of the state of the portion of a substrate on which the main portions of a self-excited inverter circuit according to the invention are formed, specifically, the state of the portion of the substrate in the vicinity of a booster transformer and a package with N-channel FETs formed therein.
Figure 1B:
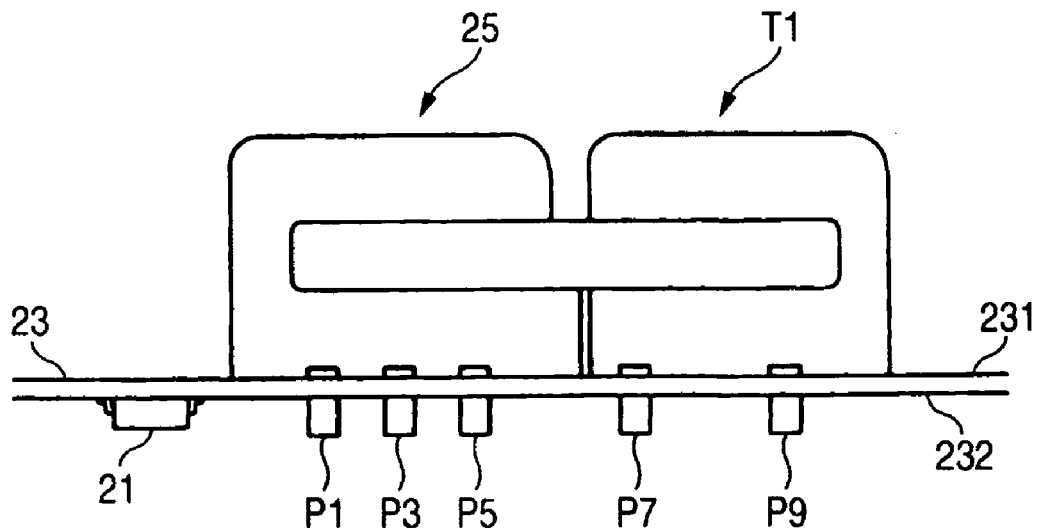

Now, FIGS. 1A and 1B are explanatory views of the state of the adjacent portions of the booster transformer and FETs 11, 12 arranged on the substrate.

The main circuit portions of the present embodiment (the portions shown in FIG. 2 except for the microcomputer 1) are formed on a phenol one-sided substrate (which is a one-sided substrate set forth in claims and is hereinafter referred to as a substrate simply) 23 only on one side surface of which there are formed patterns (printed wire patterns). For this reason, the terminals P1-P10 of the booster transformer T1 are respectively formed such that, when a transformer main body 25 is mounted on the part surface 231 of the substrate 23, the leading end portions of these terminals are projected to and from the soldered surface 232 of the substrate 23.

A package 21, which is surface mounted on the soldered surface 232, has a shape which is known well as a SOP-8 type and, inside the package 21, there are formed two FETs, that is, FET T11 and FET 12. In other words, the FETs 11 and 12 are very closely connected to each other in terms of heat. Therefore, a difference between the element temperatures of the FETs 11 and 12 is very small. Also, because the element characteristics of them are very close to each other, a difference between the gate threshold voltages thereof is also very small.

Also, in FIG. 1A, assuming that a pin 1 in the package 21 is expressed as a first pin and nine pins are arranged counterclockwise in the order of first to eighth pins, the drain of the FET 11 is connected to both seventh and eighth pins, while the gate of the FET 11 is connected to the second pin. The drain of the FET 12 is connected to both fifth and sixth pins, while the gate of the FET 12 is connected to the fourth pin. And, the package 21 is mounted in the vicinity of the booster transformer T1 in a direction where the arranging direction (shown by an arrow mark A in FIG. 1A) of the pins intersects at right angles with the longitudinal direction (shown by an arrow mark B in FIG. 1A) of the booster transformer T1. That is, the package 21 is surface mounted on the soldered surface in the vicinity of the booster transformer T1 in a mounting direction where terminals for drain (fifth to eighth pins) disposed on the package 21 face the booster transformer T1.

And, the pin P1, to which is connected one terminal of the primary coil L1, is connected to the seventh and eighth pins with the drain of the FET 11 connected thereto by a pattern 31 which is the shortest pattern, while the pin P2 with the other terminal of the primary coil L1 thereto is connected to the fifth and sixth pins with the drain of the FET 12 connected thereto by a pattern 32 which is the shortest pattern. By the way, reference numeral 33 designates a pattern for connecting together the gate of the FET 11 and feedback coil L3, while 34 designates a pattern for connecting together the gate of the FET 12 and feedback coil L3.

Now, description will be given below of the operation and action of the embodiment having the above structure.

When a power on instruction is given by a user, the microcomputer 1 controls the control circuit 3 to feed a bias voltage therefrom. The bias voltage is applied through the diode D5 and resistor R1 to the gate of the FET 11 and is also applied through the diode D5 and resistor R2 to the gate of the FET 12. In response to this, the FETs 11, 12, in accordance with the output of the feedback coil L3, are moved to their switching states in which they are alternately turned on and off repeatedly. As a result of this, there is generated a high voltage drive output in the secondary coil L2, while the high voltage drive output drives and turns on the cold cathode tube 4.

In the above operating state, when there occurs an inconvenience such as removal of the connection of the cold cathode tube 4 or the like, the voltage of the high voltage drive output generated in the secondary coil L2 rises abnormally. On the other hand, across the terminals of the capacitor C5, there is generated a voltage which is divided at a voltage division ratio to be determined by the capacity of the capacitor C4 and the capacity of the capacitor C5. Therefore, when an inconvenience such as removal of the connection of the cold cathode tube 4 or the like occurs to thereby raise the voltage of the high voltage drive output generated in the secondary coil L2, a voltage outputted from the cathode of the diode D12 is also caused to rise. When the voltage outputted from the cathode of the diode D12 exceeds a given level, the protection control circuit 2 judges that there has occurred an abnormal increase in the output voltage of the secondary coil L2 and, therefore, the protection control circuit 2 grounds the respective cathodes of the diode D3, D4. As a result of this, the bias voltages of the FETs 11, 12 become near to 0, thereby causing the switching operations of the FETs 11, 12 to stop (this stop state is kept until the power supply is turned off).

Also, in an operating state where the FETs 11, 12 are repeatedly turned on and off alternately, when there occurs an abnormal condition in the path of the high voltage drive output and there occurs an abnormal increase in the current flowing through the secondary coil L2, a voltage across the terminals of the resistor R5 is caused to rise. Accordingly, when the current flowing through the secondary coil L2 increases, a voltage outputted from the cathode of the diode D14 is also caused to rise. When the voltage outputted from the cathode of the diode D14 exceeds a given level, the protection control circuit 2 judges that the current value of the high voltage drive output outputted from the secondary coil L2 has increased abnormally and, therefore, the protection control circuit 2 grounds the respective cathodes of the diodes D3, D4. As a result of this, the bias voltages of the FETs 11, 12 become near to 0, thereby causing the switching operations of the FETs 11, 12 to stop (this stop state is kept until the power supply is turned off).

Now, it is assumed that the above-mentioned abnormal condition does not occur and the FETs 11, 12 are in the on/off alternately repeating state. Also, it is assumed that the gate threshold voltage of the FET 11 is lower than the gate threshold voltage of the FET 12. In this condition, the on time of the FET 11 is extended. Therefore, the heat value of the FET 11 is greater than the heat value of the FET 12. However, since the mutual thermal connection between the FETs 11, 12 is close, a difference between the temperatures of the FETs 11, 12 is restricted to a slight value. This makes it possible to prevent an increase in the difference between the gate threshold voltages which is caused by an increase in the difference between the temperatures thereof.

As a result of this, the difference between the on times of the FETs 11, 12 is restricted to a value corresponding to a difference between gate threshold voltages provided when the element temperatures are the same. That is, a difference between the on times of the FETs 11, 12 is restricted to a very slight value. Thus, the cold cathode tube 4 is driven and turned on by a high voltage drive output having a wave form corresponding to a sine wave. This can prevent the occurrence of an inconvenience that the luminance of the cold cathode tube 4 fails to be expected luminance.

Also, the package 21 is surface mounted in the vicinity of the booster transformer T1 in the mounting direction where terminals for drain (fifth to eighth pins) provided in the package 21 respectively face the booster transformer T1. Owing to this, the length of the pattern 31 for connecting together the pin P1 with one terminal of the primary coil L1 connected thereto and the seventh and eighth pins with the drain of the FET 11 connected thereto as well as the length of the pattern 32 for connecting together the pin P2 with the other terminal of the primary coil L1 connected thereto and the fifth and sixth pins with the drain of the FET 12 connected thereto are sufficiently shortened when compared with the prior art. Therefore, not only the level of an electromagnetic noise generated from a path for connecting together the primary coil L1 and the drain of the FET 11 but also the level of an electromagnetic noise generated from a path for connecting together the primary coil L1 and the drain of the FET 12 can be restricted to a low level.

And, in the operating state where the FETs 11, 12 are alternately turned on and off in a repetitive manner, where a resistance value (on resistance value) across the drain and source is expressed as ron and a drain current is expressed as id when the FETs 11, 12 are turned on, the power loss W of the respective FETs 11, 12 can be expressed as follows:

That is, $W = id \times id \times ron/2$

On the other hand, the drain current id provides a value proportional to the power consumption of the cold cathode tube 4 when a conversion efficiency is ignored. For the same cold cathode tube 4, the heat value of the package 21 with both of the FETs 11, 12 formed therein is double the heat value of each of two packages in which the FETs 11, 12 are respectively formed separately. Therefore, when the heat radiation efficiency of the package 21 is set identical with that of the package 91 or package 92 according to the prior art, there is a fear that the temperature of the package 21 can rise abnormally.

In view of the above, according to the present embodiment, the voltage of the operating power supply P+ is changed to 20 V from 12 V according to the prior art. As a result of this, the drain current id is 0.6 times when compared with the drain current according to the prior art. Thus, the heat value of each of the FETs 11, 12 is 0.36 times when compared with the prior art. Then, the heat value of the package 21 with both of the FETs 11, 12 formed therein is 0.72 times when compared with the heat value of the package 91 according to the prior art or the heat value of the package 92 according to the prior art. Therefore, simply by setting the heat radiation efficiency of the package 21 equivalent to that of the packages 91, 92, sufficient heat radiation is possible. That is, without changing the heat radiating method for heat radiating the package 91 or package 92 according to the prior art, the temperature of the package 21 can be maintained at a sufficiently low temperature.

Here, description will be given below of a problem to be raised when the voltage of the operating power supply P+ is changed from 12 V used in the prior art to 20 V which is higher than 12 V.

To set the current flowing through the cold cathode tube 4 at a given value while maintaining the voltage applied to the cold cathode tube at a given value cannot be attained only by optimizing the winding ratio between the primary and secondary coils L1 and L2 of the booster transformer T1 and the section area of the core of the booster transformer T1, but the gap of the core of the booster transformer T1 must be adjusted according to the characteristics (for example, inter-electrode capacity) of the cold cathode tube 4 to be used.

Also, referring to the property of the self-excited inverter circuit, when the above-mentioned characteristics in the booster transformer T1 cannot be best combined together, the conversion efficiency of the self-excited inverter circuit is lowered. Therefore, in order to prevent the lowered conversion efficiency of the self-excited inverter circuit even when trying to set the current flowing through the cold cathode tube 4 at a given value while maintaining the voltage applied to the cold cathode tube 4 at a given value, specifications relating to the booster transformer T1 such as the winding ratio between the primary and secondary coils L1 and L2 of the booster transformer T1, the gap of the core thereof, and the section area of the core must be optimized with respect to the operating power supply of 12 V.

Therefore, when, of the specifications of the booster transformer T1 optimized by limiting the operating power supply to 12 V, the winding ratio and the gap are changed to thereby set the current flowing through the cold cathode tube 4 at a given value while maintaining the voltage applied to the cold cathode tube 4 at a given value in the operating power supply P+ of 20 V, there is raised a problem that the conversion efficiency is lowered. In other words, when simply employing a method of changing part of the specifications of the booster transformer T optimized with the voltage of the operating power supply limited to 12 V, it is difficult to provide the booster transformer T1 that is best appropriate when the operating power supply P+ is of 20 V.

Also, the booster transformer T1 is provided as a standardized product having the same specifications. For this reason, when the voltage of the operating power supply P+ is set for a voltage different from 12 V, it is not possible to use a booster transformer which is provided as a standardized product, but there arises the need to decide new specifications including the section area of the core of the booster transformer. Therefore, in the developing site of a self-excited inverter circuit for driving and turning on the cold cathode tube 4, the idea to use a voltage different from 12 V in the operating power supply P+ provides an idea which incurs difficulty.

That is, in a self-excited inverter circuit for driving and turning on the cold cathode tube 4 which provides the light source of the backlight 45 of the small-size liquid crystal panel 41 of 15 inches or the like, it is difficult for the skilled person to easily think of and provides a sufficient inventive step to provide a structure that, by setting the operating power supply P+ at a voltage of 20 V different from a voltage of 12 V, not only the two FETs 11, 12 are formed in the single package 21 but also the total heat value of the package 21 can be set equivalent to or smaller than the heat value of a package with only a single FET formed therein.

And, the effect of the change of the voltage of the operating power supply P+ from 12 V to 20 V not only produces the effect of restriction of the total amount of the heat value of the package 21 but also produces the effect of restriction of the level of electromagnetic noises generated from the patterns 31, 32. The reason for this is that the level of electromagnetic noises generated from the patterns 31, 32 is proportional to the drain current and the drain current can be reduced when compared with the case where the operating power supply P+ has a voltage of 12 V.

Thus, not only the restriction effect obtained by the shortened lengths of the patterns 31, 31 but also the restriction effect obtained by the reduction of the drain current work synergistically on the electromagnetic noises generated from the patterns 31, 32. Therefore, the electromagnetic noises generated from the patterns 31, 32 can be restricted to a sufficiently low level when compared with the prior art. This makes it possible to set the position relationship with other parts more freely, which can provide another effect that the freedom of development of the product can be increased.

By the way, the invention is not limited to the above-mentioned embodiment. For example, although description has been given of the embodiment in which the voltage of the operating power supply P+ is set as 20 V, the voltage may have another value. When the voltage is set higher than 15 V, there can be obtained a sufficient effect in restricting the total amount of the heat value of the package 21.

Also, when the size of the liquid crystal panel 41 is set for 20 inches or smaller, a self-excited inverter circuit is advantageous over a separately excited inverter circuit in that it can provide a better efficiency and requires a smaller number of parts. Therefore, as for the size of the liquid crystal panel 41, the invention can also apply similarly to a liquid crystal panel 41 which has an arbitrary size smaller than 20 inches.

Also, as for the package in which the FETs 11, 12 are formed, description has been given of an embodiment in which it is formed of an SOP-8 type. However, a package having another shape can also be employed.

What is claimed is:

1. A self-excited inverter circuit, comprising:
    a booster transformer with a secondary coil, a feedback coil, and a primary coil respectively wound thereon, the primary coil including a center tap to which operating power is supplied;
    a first N-channel FET having a drain to which is connected one terminal of the primary coil, and having a gate to which is connected one terminal of the feedback coil;
    a second N-channel FET having a drain to which is connected the other terminal of the primary coil, and having a gate to which is connected the other terminal of the feedback coil; and
    a control configured to turn on and off the first N-channel FET and the second N-channel FET alternatively for turning on a discharge tube for a back light of a liquid crystal tube,
    wherein:
    the first and second N-channel FETs are formed in a single package;
    the package has terminals which are respectively connected to the drain of the first N-channel FET and the drain of the second N-channel FET;
    the package is arranged such that the terminals face the booster transformer;
    the package is mounted on a soldered surface of a substrate adjacent to the booster transformer where the drain terminal of the first N-channel FET and the drain terminal of the second N-channel FET respectively face the booster transformer;
    the size of the liquid crystal panel is approximately 15 inches; and
    the voltage of the operating power is approximately 20 V.

2. A self-excited inverter circuit comprising:
    a substrate having a soldered surface;
    a booster transformer with a secondary coil, a feedback coil, and a primary coil respectively wound thereon, the primary coil including a center tap to which operating power is supplied;
    a first N-channel FET having a drain to which is connected one terminal of the primary coil, and having a gate to which is connected one terminal of the feedback coil;
    a second N-channel FET having a drain to which is connected the other terminal of the primary coil, and having a gate to which is connected the other terminal of the feedback coil;
    a control configured to turn on and off a first N-channel FET and a second N-channel FET alternatively for turning on a discharge tube for a back light of a liquid crystal tube; and
    a single package mounted on the soldered surface of the substrate and accommodating the first and second N-channel FETs therein;
    wherein the package has terminals which are respectively connected to the drain of the first N-channel FET and the drain of the second N-channel FET; and
    the package is arranged such that the terminals face the booster transformer.

3. The self-excited inverter circuit according to claim 2, wherein:
    the size of the liquid crystal panel is 20 inches or smaller; and
    the voltage of the operating power is 15 V or higher.

* * * * *